(12) United States Patent
Rosen

(10) Patent No.: US 7,149,139 B1
(45) Date of Patent: Dec. 12, 2006

(54) CIRCUITRY AND METHODS FOR EFFICIENT FIFO MEMORY

(75) Inventor: Eitan Rosen, Abirim (IL)

(73) Assignee: Marvell Semiconductor Israel Ltd., Yokneam (IL)

( * ) Notice: Subject to any disclaimer, the term of this patent is extended or adjusted under 35 U.S.C. 154(b) by 104 days.

(21) Appl. No.: 10/925,641

(22) Filed: Aug. 23, 2004

Related U.S. Application Data

(60) Provisional application No. 60/539,764, filed on Jan. 28, 2004.

(51) Int. Cl.
*G11C 7/00* (2006.01)

(52) U.S. Cl. ............... 365/221; 365/233; 365/230.05; 365/189.04; 365/189.12

(58) Field of Classification Search ............ 365/221, 365/233, 230.05, 189.02, 189.04, 189.12
See application file for complete search history.

(56) References Cited

U.S. PATENT DOCUMENTS

| | | | |
|---|---|---|---|
| 4,954,987 A | 9/1990 | Auvinen et al. | 365/189.02 |
| 5,546,347 A | 8/1996 | Ko et al. | 365/221 |
| 5,663,910 A | 9/1997 | Ko et al. | 365/189.05 |
| 6,678,201 B1 | 1/2004 | Roohparvar et al. | 365/221 |
| 2005/0091465 A1* | 4/2005 | Andreev et al. | 711/168 |

FOREIGN PATENT DOCUMENTS

WO    WO 99/13397    3/1999

* cited by examiner

*Primary Examiner*—Richard Elms
*Assistant Examiner*—Pho M. Luu

(57) ABSTRACT

Circuitry and methods for an efficient FIFO memory are provided. This efficient FIFO memory has two smaller standard single-port memory banks instead of one large dual-port memory bank, as in typical FIFO memories. Whereas the dual-port memory based FIFO memory can read and write data at the same time, a typical single-port memory based FIFO cannot. The operation of the two single-port memory banks are coordinated in order to provide similar or better performance than a dual-port memory based FIFO.

30 Claims, 4 Drawing Sheets

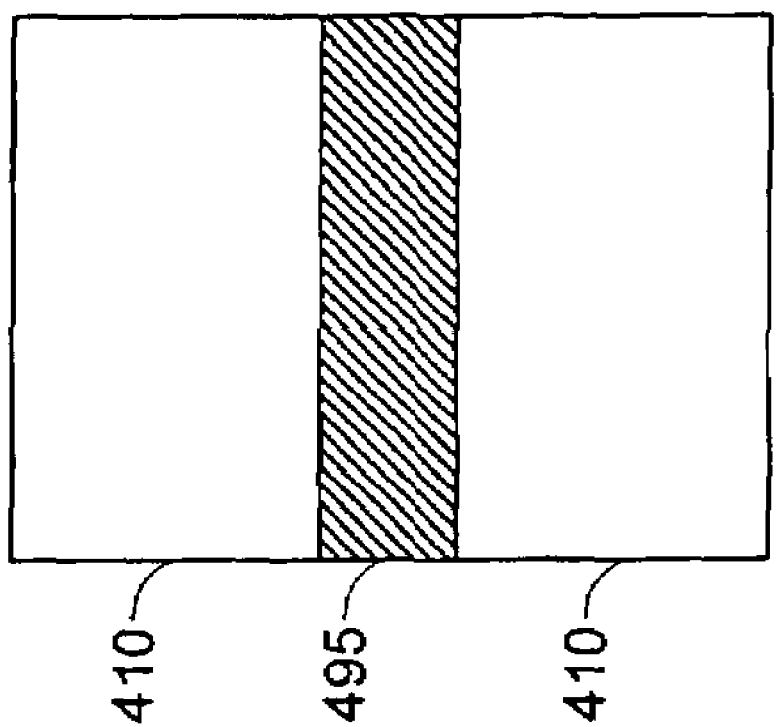

CIRCUITRY AND METHODS FOR EFFICIENT FIFO MEMORY

This application claims the benefit of provisional application 60/539,764 filed Jan. 28, 2004, which is hereby incorporated by reference herein in its entirety.

BACKGROUND OF THE INVENTION

This invention relates to circuitry and methods for efficient first-in-first-out (FIFO) memory. FIFO memory is one type of memory that can be used to temporarily store or buffer data. FIFO memory is especially useful for translating data between different frequency domains. A first circuit can write data to the FIFO at a first data rate and a second circuit can read the data from the FIFO at a second data rate. Both circuits can access the FIFO in their respective frequency domains and transfer data between their respective frequencies without any real coordination or handshaking between the domains.

Typical FIFO memories are able to read and write data every clock cycle. Accordingly, typical FIFO memories are often built from dual-port memory cells that allow the simultaneous reading and writing of data to the memory. Dual-port memory cell FIFO memories are larger and more complex than standard memory cells.

It would therefore be desirable to provide circuitry and methods for an efficient FIFO memory that provides the speed and versatility of two-port memory based FIFO memory, but that has a reduced size, reduced power consumption, and increased speed.

SUMMARY OF THE INVENTION

In accordance with the invention, an efficient first-in-first-out (FIFO) memory is provided. This efficient FIFO memory has two smaller standard single-port memory banks instead of one large dual-port memory bank as in typical FIFO memories. Whereas the dual-port memory based FIFO can read and write data at the same time, single-port memory based FIFO cannot. In accordance with the invention the operation of the two single-port memory banks are coordinated in order to provide similar or better performance than a dual-port memory based FIFO.

As data is written to the efficient FIFO memory, each data word is stored in alternating memory banks. For example, the first data word is written to the first memory bank, the second data word is written to the second memory bank, the third data word is written to the first memory bank, and so on. When a stream of data is being written to the efficient FIFO memory, each data bank is being written to only about half of the time.

When the data is read from the efficient FIFO memory, the data is also read from the alternating memory banks. Thus, reading a stream of data similarly accesses each memory bank about half of the time.

Accordingly, the efficient FIFO memory can read and write at the same time by performing read operations on one memory bank while performing write operations on the other memory bank.

Further features of the invention, its nature and various advantages, will be more apparent from the accompanying drawings and the following detailed description of the preferred embodiments.

BRIEF DESCRIPTION OF THE DRAWINGS

FIG. 4 is a simplified layout of a FIFO memory circuit in accordance with the invention.

DETAILED DESCRIPTION

Figure 1:
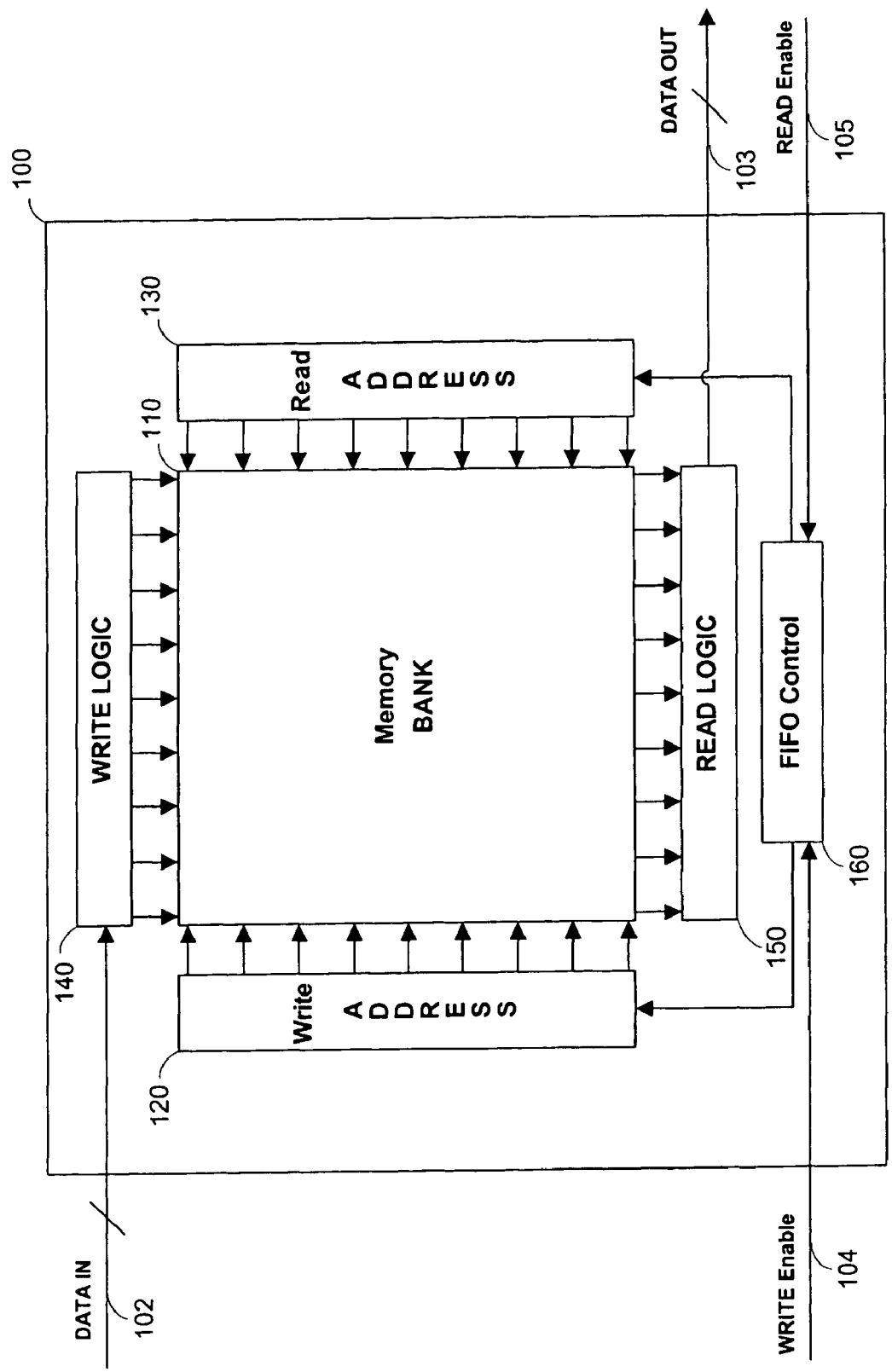
FIG. 1 is a simplified schematic of a first-in-first-out (FIFO) memory circuit.

FIG. 1 shows a simplified schematic of a typical first-in-first-out (FIFO) memory circuit 100. FIFO 100 includes a dual-port memory bank 110, write address decoder 120, read address decoder 130, write logic 140, read logic 150, and FIFO control logic 160.

When data is written to FIFO 100, data is placed on data-in bus 102, which is connected to write logic 140. Write enable signal 104 alerts FIFO control 160 that there is data to be written to FIFO 100. FIFO control 160 determines whether there is space available in memory bank 110. If there is available space in memory bank 110, FIFO controller 160 sends the address of the next available memory location to write address decoder 120. Alternatively write address decoder 120 may have a counter which keeps track of the last memory address written and the signal from FIFO controller 160 increments the counter to the next valid memory address. Write address decoder 120 activates the address in memory bank 100 where the data is to be written and write logic 140 writes the data into memory bank 110.

Memory read operations occur in a similar manner. A read enable signal 105 alerts FIFO control 160 that a read operation is about to occur. Read address decoder 130 activates the location in memory bank 110 to be read and the data is received and output by read logic 150.

Memory bank 110 is a dual-port memory bank. Dual-port memory, while larger and more complex than single-port memory, allows simultaneous write and read operations. Thus, data may be written to or read from FIFO 100 at the same time. This eliminates delays associated with and access conflict caused by simultaneous access by write and read circuitry, and it also eliminates the need to coordinate write and read operations within the FIFO circuitry.

FIFO 100 receives, stores, and outputs stored data. In the embodiment shown all of the write and read operations occur synchronously with a reference clock signal (not shown). According to another embodiment, the write and read operations may occur at different times not synchronized to a single reference clock signal.

In either embodiment, FIFO control 160, along with write address decoder 120 and read address decoder 130, manage the data stored in FIFO 100. Data counters store pointers to the location in memory of the next free memory location for data to be written and the location of the next data to be read. As new data is written to or read from FIFO 100, the pointers are updated.

Figure 2:
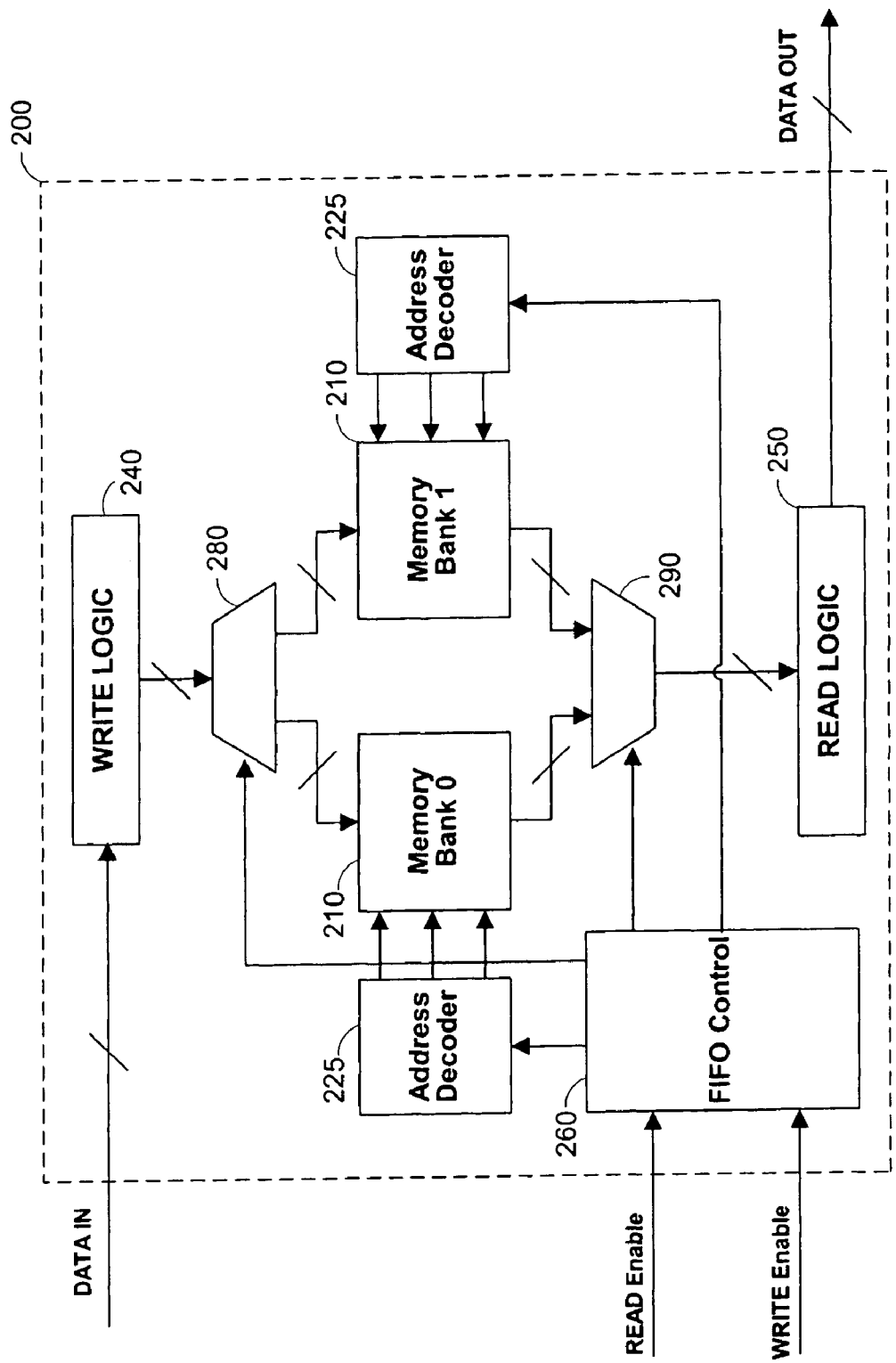
FIG. 2 is a simplified schematic of a FIFO memory circuit in accordance with the invention.

FIG. 2 shows a simplified schematic of an efficient FIFO memory 200 in accordance with the invention. FIFO 200 includes two single-port memory banks 210, two address decoders 225, write logic 240, read logic 250, FIFO control logic 260, de-multiplexer 280, and multiplexer 290.

FIFO 200 operates in a similar manner as typical FIFO 100. When data is written to FIFO 200, write enable signal 204 alerts FIFO control 260 to write the received data into memory. Similarly, when read enable signal 205 is activated, FIFO control 260 reads and outputs data from memory. FIFO 200 may operate according to the specifications of typical FIFO memories, having the same inputs, outputs, and control signals. According to some embodiments of the present invention, FIFO 200 may provide improved performance over typical FIFO memories.

FIFO 200 contains two single-port memory banks 210 instead of the single dual-port memory bank 110 contained in FIFO 100. Because each single-port memory bank 210 can only perform a single operation at a time (i.e., a write or a read operation) each memory bank 210 is connected to a single address decoder 225. In contrast, FIFO 100 has two address decoders 120 and 130 for the single dual-port memory bank 110. As in FIFO 100, whenever data is to be written to or read from one of memory banks 210, the address is loaded into an address decoder 225, while the data is either written by write logic 240 or read by read logic 260.

By coordinating the operations of the two single-port memory banks 210, FIFO 200 can provide simultaneous write and read operations that typically require the additional size and complexity of dual-port memory. Each memory bank 210 can only perform a single write or read operation at one time, but both memory banks 210 can be controlled and coordinated to perform simultaneous operations. For example, data can be written to the first memory bank 210 at the same time data is read from the second memory bank 210. Thus, FIFO 200 can operate in a similar manner as a FIFO that contains dual-port memory.

In order to coordinate the operation of the two memory banks 200, FIFO control 260 switches de-multiplexer 280 and multiplexer 290 to control which memory bank 210 is being written to and which memory bank 210 is being read. De-multiplexer 280 controls which memory bank 210 receives the output of write logic 240. Multiplexer 290 controls which memory bank 210 is output to read logic 250. During normal operations, de-multiplexer 280 and multiplexer 290 each select different memory banks to allow simultaneous write and read operations.

In the embodiment shown in FIG. 2, de-multiplexer 280 and multiplexer 290 each receive control signals from FIFO control 26. Alternatively, de-multiplexer 280 and multiplexer 290 can be designed to receive a single control signal. In another alternative embodiment, de-multiplexer 280 and multiplexer 290 can both receive their control signals from one or both address decoders 225 or another suitable control source.

FIFO 200 can provide simultaneous write and read operations as long as the same memory bank is not subject to both operations. According to the preferred embodiment, when data is written to FIFO 200 each data word is stored in alternating memory banks 210. Thus, each data bank is only being written to half of the time. Accordingly, when this stored data is read from FIFO 200, the data will also be read from the alternating data banks. This will evenly distribute the data between both memory banks 210, increasing the ability of FIFO 200 to perform simultaneous write and read operations.

Alternatively, the data written to FIFO 200 may be divided between memory banks 210 according to other algorithms. For example, several data words may be written to each memory bank 210 before switching to the other memory bank 210. Further, the number of data words written to each memory bank 210 or the timing for alternating between memory banks 210 may follow a more complex pattern which may provide increased efficiency and speed. The algorithm may also be varied based on the amount or timing of the data being written to or read from FIFO 200. For example, if a large amount of data is going to be written to FIFO 200, all of the data may be written to a first memory bank 210 until the data is about to be read. When the data that was written to the first memory bank 210 is being read the rest of the data can be written to the second memory bank. Other suitable algorithms may also be used in accordance with the invention.

FIFO control 260 controls all of the operations of FIFO 200 including which memory banks 210 are accessed for writing or reading. In typical FIFO 100 one or more counters keep track of memory locations to write new data and to read data from memory. By keeping track of the last memory location written and the next memory location to be read, FIFO 100 is able to store data, retrieve data, and alert the system if FIFO 100 is full or empty.

FIFO 200 also contains counters in FIFO controller 260 to coordinate the storage and retrieval of data. In FIFO 200, however, the counters also need to track which memory bank 210 each data word is written to and where to read each data word. Accordingly, memory counters may keep track of the next available memory location for writing data in each memory bank 210 and the next memory location containing data to be read in each memory bank 210. Further, the counters may track which memory banks 210 are to be accessed for each write and read operation. The number and complexity of the counters may vary depending on the specific algorithm used to distribute the data alternately between memory banks 210.

In accordance with the invention, data can be simultaneously written to and read from FIFO 200 as long as the write and read operations occur in different memory banks 210. However, if data is about to be written to the same memory bank that contains the data to be read, both operations cannot occur simultaneously. In this situation either the write or the read operation may be delayed until the following clock cycle. Alternatively, in order to avoid adversely impacting the overall performance of FIFO 200, the data to be written can be stored in a suitable temporary storage device while performing the requested READ operation. The data stored in the temporary storage device may then be written to memory bank 210 during the next clock cycle.

Figure 3:
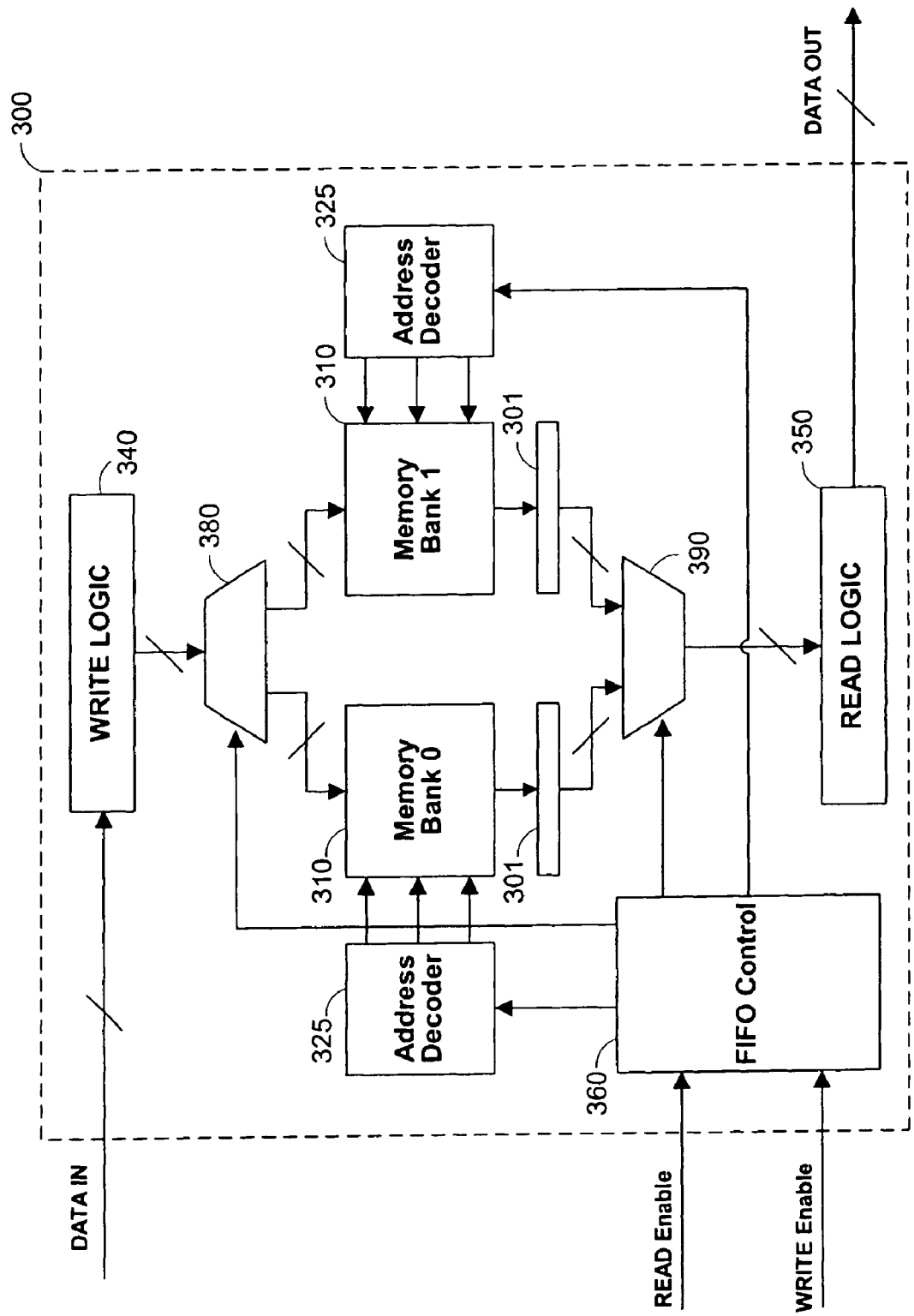
FIG. 3 is a simplified schematic of another FIFO memory circuit in accordance with the invention.

FIG. 3 shows a simplified schematic of another embodiment of an efficient FIFO memory 300 which deals with this issue in accordance with the invention. FIFO 300 handles access conflicts without adversely impacting overall performance by temporarily storing data to be read in two or more data registers 301. Data registers 301 are any suitable data storage device such as, for example, a flip-flop array, a latch array, or a memory bank capable of storing at least one data word. Data registers 301 are connected between the memory banks 310 and multiplexer 390. Data registers 301 store at least one data word from each memory bank 210.

When each memory bank 210 is idle, the next data word or words are read from each memory bank 210 and temporarily stored in data registers 301. The data then is read from data registers 301 instead of directly from memory banks 210, thereby reducing the problems of access conflicts.

For example, when data is written to and read from the same memory bank 210 at the same time, the data to be read is read from register 301 while the data to be written is written to the corresponding memory bank 210. During the next clock cycle, the next data word can be read from memory bank 210 into register 301 while data is written into the next memory bank 210. Thus, access conflicts are preferably eliminated by temporally storing the data to be read in registers 301. If desired, registers 301 may be designed to temporarily store multiple data words. Further, when data is written to an empty memory bank 210, the data may be bypassed directly to data register 301.

In accordance with the invention, write and read circuitry operate synchronously within the efficient FIFO memory. Because the write and read circuitry alternates between the two memory banks, the write and read circuitry operate synchronously to avoid access conflicts. Typical FIFO 100 does not have this requirement and thus may allow asynchronous write and read operations. According to one embodiment of the present invention, an efficient FIFO memory may permit asynchronous write and read operations by incorporating a small conventional FIFO buffer (preferably built with flip flops). When added to the input or output of the efficient FIFO memory, in accordance with the invention, the small conventional FIFO buffer may provide frequency conversions for asynchronous write and read operations. For example, if writing occurs at a higher frequency than reading, the efficient FIFO may operate at the higher writing frequency. The output of the efficient FIFO may be written to the small conventional FIFO buffer at the higher frequency and read asynchronously from the small conventional FIFO buffer at the lower frequency. Thus, by providing a small conventional FIFO buffer, efficient FIFO memory can provide asynchronous performance with minimal or no impact on the speed, size, or performance of the FIFO.

FIG. 4 shows a simplified layout of an efficient FIFO memory 400 in accordance with the invention. FIFO memory 400 contains memory banks 410 and memory logic 495. Memory logic may include FIFO control 260, write logic 240, read logic 250, address decoders 225, de-multiplexer 280, multiplexer 290, and any other logic circuits. Memory logic 495 may be located between the memory banks 410 to provide balanced and efficient access to both memory banks 410.

Efficient FIFO memory 400 is smaller and faster than traditional FIFO memory 100. Using two single-port memory banks instead of a single dual-port memory bank may reduce, by about half, the total area of FIFO memory 400 occupied by the memory bank. Memory logic 495 is preferably only slightly larger in efficient FIFO memory 400, than in typical dual-port FIFO memory 100. Accordingly, using FIFO 400 instead of typical FIFO 100, may preferably provide about a forty percent reduction in the total size of FIFO 400. Further, using two half-size memory banks 410 instead of a single full-size memory bank may also reduce the power consumption and increase the speed of FIFO 400. By alternately using two memory banks instead of constantly using a single memory bank, FIFO 400 may use around fifty percent less power than typical FIFO 100. Further, the shorter bit lines of the half-sized dual memory banks 410 consume less power and have less capacitance than the bit lines of a full-sized memory bank. Accordingly, in total, FIFO 400 may preferably have a total power saving of about seventy percent over typical FIFO 100.

Thus it is seen that circuitry and methods for an efficient FIFO memory are provided. One skilled in the art will appreciate that the invention can be practiced by other than the described embodiments, which are presented for purposes of illustration and not of limitation, and the present invention is limited only by the claims which follow.

The invention claimed is:

1. A method of providing an efficient FIFO memory comprising:
   receiving data having a plurality of portions;
   alternately writing said data to a first memory and a second memory; and
   alternately reading said data from said first memory and said second memory, wherein alternately reading said data comprises alternately writing said data to a first data register and a second data register and alternately reading said data from said first data register and said second data register,
   wherein each of said first memory and said second memory is not concurrently written and read.

2. The method of claim 1, wherein the alternately writing comprises writing a first portion of said data to said first memory and writing a second portion of said data to said second memory.

3. The method of claim 1, wherein the alternately reading comprises writing a first portion of said data from said first memory to a first data register, reading said first portion of said data from said first data register, writing a second portion of said data from said second memory to a second data register, and reading said second portion of said data from said second data register.

4. The method of claim 1, wherein the alternately writing comprises alternating memory after writing each portion of said data.

5. The method of claim 1, wherein the alternately reading comprises alternating memory after reading each portion of said data.

6. The method of claim 1, wherein the alternately reading and the alternately writing are synchronous.

7. Circuitry for providing an efficient FIFO memory comprising:
   means for receiving data having a plurality of portions;
   means for alternately writing said data to a first memory means and a second memory means; and
   means for alternately reading said data from said first memory means and said second memory means, wherein means for alternately reading said data comprises means for alternately writing said data to a first data register means and a second data register means and means for alternately reading said data from said first data register means and said second data register means,
   wherein each of said first memory means and said second memory means is not concurrently written and read.

8. The circuitry of claim 7, wherein the means for alternately writing comprises means for writing a first portion of said data to said first memory means and means for writing a second portion of said data to said second memory means.

9. The circuitry of claim 7, wherein the means for alternately reading comprises means for writing a first portion of said data from said first memory means to a first data register means, means for reading said first portion of said data from said first data register means, means for writing a second portion of said data from said second memory means to a second data register means, and means for reading said second portion of said data from said second data register means.

10. The circuitry of claim 7, wherein the means for alternately writing comprises means for alternating memory means after writing each portion of said data.

11. The circuitry of claim 7, wherein the means for alternately reading comprises means for alternating memory means after reading each portion of said data.

12. The circuitry of claim 7, wherein the means for alternately reading and the means for alternately writing are synchronous.

13. FIFO memory comprising:
a first memory bank and a second memory bank;
a first data register and a second data register;
WRITE logic operative to receive data having a plurality of portions and to alternately write said data to said first memory bank and said second memory bank; and
READ logic operative to alternately read said data from said first memory bank and said second memory bank, wherein the READ logic is further operative to alternately write said data to said first data register and said second data register and alternately read said data from said first data register and said second data register,
wherein each of said first memory bank and said second memory bank is not concurrently written and read.

14. The FIFO memory of claim 13, wherein the WRITE logic operative to alternately write said data is further operative to write a first portion of said data to said first memory bank and to write a second portion of said data to said second memory bank.

15. The FIFO memory of claim 13, wherein the READ logic operative to alternately read said data is further operative to write a first portion of said data from said first memory bank to a first data register, to read said first portion of said data from said first data register, to write a second portion of said data from said second memory bank to a second data register, and to read said second portion of said data from said second data register.

16. The FIFO memory of claim 13, wherein the WRITE logic operative to alternately write said data is further operative to alternate memory banks after writing each portion of said data.

17. The FIFO memory of claim 13, wherein the READ logic operative to alternately read said data is further operative to alternate memory banks after reading each portion of said data.

18. The FIFO memory of claim 13, wherein the WRITE logic and READ logic are synchronous.

19. A method of providing an efficient FIFO memory comprising:
receiving data having a plurality of portions;
alternately writing said data to a first memory and to a second memory, wherein at least two consecutive portions of data are written to one of said first memory and said second memory; and
alternately reading said data from said first memory and said second memory,
wherein each of said first memory and said second memory is not concurrently written and read.

20. The method of claim 19, wherein a plurality of consecutive portions of data are written to said first memory and said second memory.

21. The method of claim 19, wherein alternately writing and alternately reading comprise alternating memory in accordance with a predetermined pattern.

22. The method of claim 19, further comprising:
writing a first portion of said data to a data register; and
reading said first portion of said data from said data register.

23. Circuitry for providing an efficient FIFO memory comprising:
means for receiving data having a plurality of portions;
means for alternately writing said data to a first memory means and to a second memory means, wherein at least two consecutive portions of data are written to one of said first memory means and said second memory means; and
means for alternately reading said data from said first memory means and said second memory means,
wherein each of said first memory means and said second memory means is not concurrently written and read.

24. The circuitry of claim 23, wherein a plurality of consecutive portions of data are written to said first memory means and said second memory means.

25. The circuitry of claim 23, wherein alternately writing means and alternately reading means comprise alternating memory means in accordance with a predetermined pattern.

26. The circuitry of claim 23, further comprising:
means for writing a first portion of said data to a data register means; and
means for reading said first portion of said data from said data register means.

27. FIFO memory comprising:
a first memory bank and a second memory bank;
WRITE logic operative to receive data having a plurality of portions and to alternately write said data to said first memory bank and to said second memory bank, wherein at least two consecutive portions of data are written to one of said first memory bank and said second memory bank; and
READ logical operative to alternately read said data from said first memory bank and said second memory bank,
wherein each of said first memory bank and said second memory bank is not concurrently written and read.

28. The FIFO memory of claim 27, wherein a plurality of consecutive portions of data are written to said first memory bank and said second memory bank.

29. The FIFO memory of claim 27, wherein the WRITE logic operative to alternately write said data and the READ logic operative to alternately read said data are further operative to alternate memory banks in accordance with a predetermined pattern.

30. The FIFO memory of claim 27, further comprising:
a data register operative to store a portion of said data; and
READ logic operative to read said first portion of said data from said data register.

* * * * *